Oct. 22, 1963
J. S. NEWTON
3,107,903
CUTTING MACHINE LOAD CONTROL
Filed Oct. 6, 1961
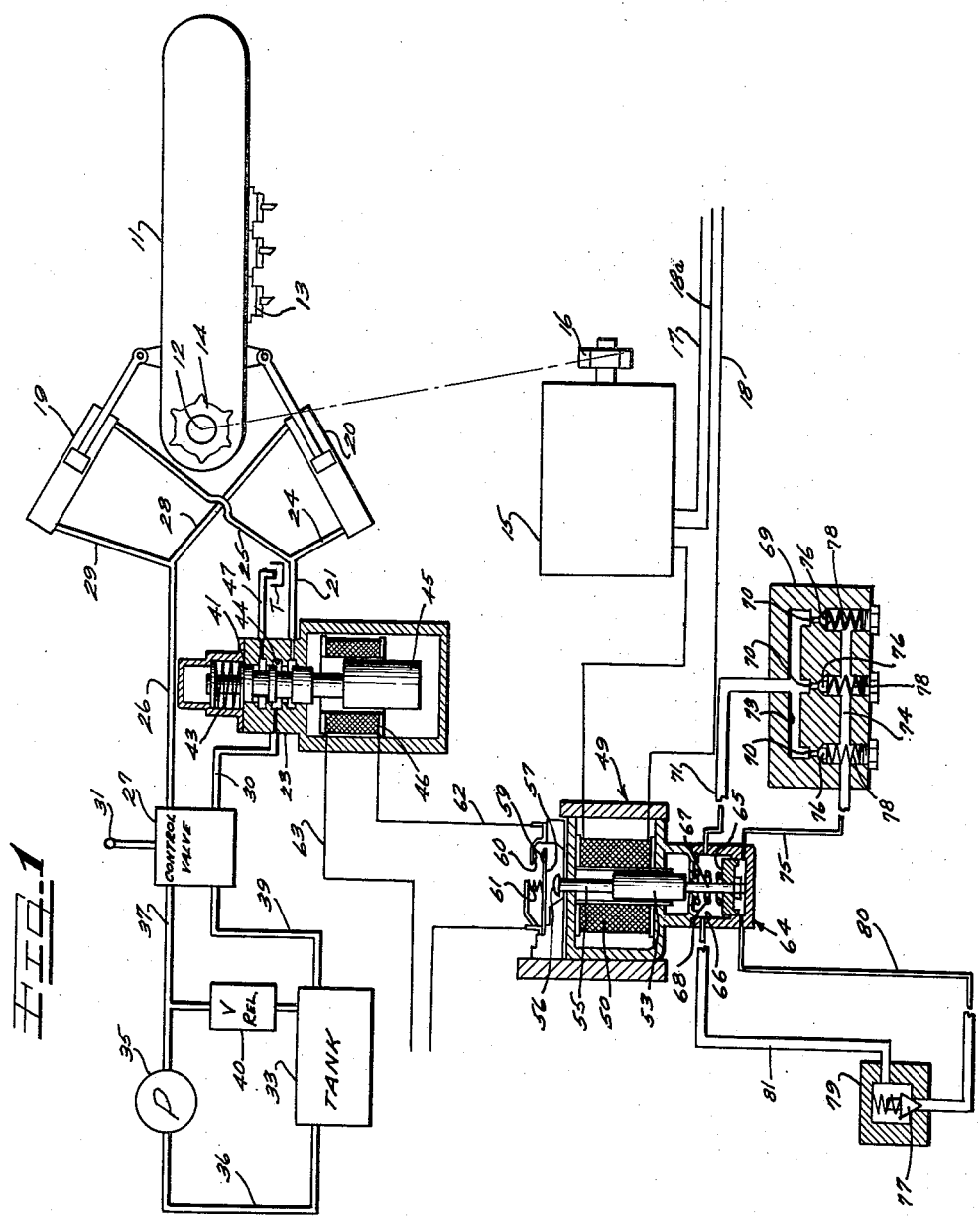
INVENTOR.
JOHN S. NEWTON
BY
ATTORNEYS United States Patent Office 3,107,903
Patented Oct. 22, 1963

3,107,903
CUTTING MACHINE LOAD CONTROL
John S. Newton, Glen Ellyn, Ill., assignor to Goodman Manufacturing Company, Chicago, Ill., a corporation of Illinois
Filed Oct. 6, 1961, Ser. No. 143,505
6 Claims. (Cl. 262—28)

This invention relates to improvements in load controls for cutting apparatus and more particularly relates to an improved form of load control stopping the advance of the cutting apparatus upon predetermined overload conditions.

In the operation of cutting apparatus and particularly cutting apparatus which is rotatably or linearly driven and is advanced or fed into a body being worked upon as it is driven, to effect a cutting operation and more particularly in high capacity mining machinery, the cutting apparatus drive motor is designed to meet a normal maximum cutting resistance, and is frequently overloaded when impurities in the seam being mined are encountered, which materially increase the circuit load.

While circuit breakers have been used as overload protection, when overload conditions are encountered the drive motor is shut down with a resultant loss of time in restarting the motor.

Efforts have been made to eliminate the shutting down of the motor by providing an overload protection control which slows down the feed of the cutting apparatus as the motor is loaded close to its full load and which completely stops the advance of the cutting apparatus upon predetermined relatively small overloads. With such a control, the motor never continually operates at peak capacity with a maximum cutting advance, resulting in a decrease in speed and efficiency in the cutting operation.

The object of the present invention is to overcome the foregoing deficiencies in motor controls by providing an automatic control for cutting apparatus which will allow the cutting apparatus drive motor to operate at peak motor capacity during the entire cutting operation without impairing the cutting efficiency of the apparatus.

Another object of the invention is to provide a simplified and improved form of overload safeguard for cutting apparatus of the type that is advanced into the material being worked upon as driven translationally or rotatably, which will assure a maximum rate of cutting advance during the cutting operation.

A further object of the invention is to provide an improved form of overload protection for a cutting apparatus so arranged as to accommodate operation of the cutting apparatus at maximum drive motor load during the entire cutting operation, and to avoid the discontinuance of the cutting operation as small overloads of short duration are encountered.

A still further object of the invention is to improve upon the control for feeding the cutting apparatus of mining machines and the like in which the cutting apparatus is advanced hydraulically and is driven to effect a cutting operation by an electric motor, by utilizing an electrically energizable sensing device in the motor circuit sensing the load on the motor and operable to effect the stopping of the advance of the cutting apparatus upon continued overload conditions, and by retarding the operation of the sensing device to prevent the stopping of the advance of the cutting apparatus except upon continued overload conditions.

These and other objects of the invention will appear from time to time as the following specification proceeds and with reference to the accompanying drawing in which the FIGURE diagrammatically illustrates a fluid pressure control circuit for carrying out the invention.

In the embodiment of the invention illustrated in the drawing, I have shown for illustrative purposes a cutter bar 11 of a bottom cutting or universal cutting machine. The cutter bar 11 is swingable by power about a vertical pivot 12 to advance the cutter bar and a cutter chain 13 orbitally driven thereabout across a working face of a coal seam to cut a kerf therein, in a conventional manner.

It should be understood, however, that the control of the invention need not necessarily be applied to control feeding movement of a cutter bar, but may be applied to any form of cutting apparatus having a driven cutting surface and a separate power advance or feed for the cutting apparatus, such as the advancing means of a boring head of a continuous mining machine, a drill or saw or any other similar cutting apparatus.

A cutter chain sprocket 14 driven from a motor 15 through a geared reduction train 16 is provided to drive the cutter chain 13 about the cutter bar 11. The motor 15 may be a heavy duty electric motor energized through conductors 17 and 18 under the control of a suitable controller (not shown) and no part of the present invention so not herein shown or described. A ground conductor 18a is also shown.

Double acting hydraulic jacks 19 and 20 are pivotally connected to opposite sides of the cutter bar 11 to feed or advance said cutter bar about the axis of the pivot 12 and thereby advance the cutter chain across a mine face to cut a kerf therein. As herein shown, a pressure line 21 leading from a stop or shut-off valve 23 is connected with the head end of the jack 20 and piston rod end of the jack 19 through pressure lines 24 and 25 respectively, leading from the pressure line 21, to effect pivotal movement of the cutter bar 11 about the pivotal axis 12 in a feeding direction.

A pressure line 26 leading from a control valve 27 is connected with the piston rod end of the hydraulic jack 20 and the head end of the hydraulic jack 19 through pressure lines 28 and 29 respectively to effect return movement of the cutter bar 11 to an initial cutting position after termination of a cutting operation.

The control valve 27 may be a conventional form of metering control valve selectively operable to supply fluid under pressure to the pressure line 26 or a pressure line 30 connected with the stop or shut off valve 23 to supply fluid under pressure to the pressure line 21 under the control of said stop valve by manual operation of an operating handle 31. The control valve 27 may also be operable to vary the volume of fluid under pressure supplied to either of the pressure lines 26 or 30 by operation of the operating handle 31 thereof.

The source of supply of fluid under pressure for advancing the cutter bar 11 includes a tank 33 connected with a pump 35 through a pressure line 36 and connected with the control valve 27 through a pressure line 37. Fluid is returned from the jacks 19 and 20 through the control valve 27 to the tank 33 through a return line 39.

A relief valve 40 is connected from the pressure line 37 from the tank 33 to return fluid to the tank 33 upon overload conditions and when the control valve 27 is in its "off" position and the pump 35 is operating.

The valve 23 is shown in the drawings as being a solenoid operated spool valve of a well known form including a valve spool 41 biased by a spring 43, to accommodate fluid under pressure to pass from the control valve 27 through the pressure line 30 to and through a valve chamber 44 of the stop valve 23 to the pressure line 21, to supply fluid under pressure to the hydraulic jacks 19 and 20 to advance the cutter bar 11 in a cutting direction. The valve spool 41 has an armature 45 extending from its end opposite the spring 43 through a solenoid coil 46. Upon energization of the coil 46 the armature 45 is moved along the coil to move the valve spool into position to block the passage of fluid through the pressure line 21 and to by-pass fluid under pressure from the pressure line 30 through a return line 47 connected to tank. The advance of the cutter bar 11 will thus be stopped upon energization of the solenoid coil 46.

An overload relay 49 having an electromagnetic coil 50 forming a sensing means sensing the load exerted by the cutter bar 11 on the body being worked upon, is provided to effect energization of the solenoid coil 46 and actuate the shut off or stop valve 23 following the sensing of an overload condition above a predetermined load. The electromagnetic coil 50 is connected in the circuit for the motor 15 in the conductor 18 and is continually energized at the load of the motor 15.

The electromagnetic coil 50 has an armature 53 therein having a stem 55 extending therefrom and having a button 56 on its outer or upper end engageable with a switch arm 57. Energization of the coil 50 at overload currents on the motor 15 will thus move the switch arm 57 to engage a contact 59 on its free end with a stationary contact 60. A spring 61 biases the switch arm in position to break the circuit through the contacts 59 and 60. When the switch arm is moved by the button 56 to complete a circuit through the contacts 59 and 60 an energizing circuit is completed to the solenoid coil 46 through conductors 62 and 63.

This will effect movement of the valve spool 41 against the spring 43 and shut off the flow of fluid under pressure to the pressure line 21 and feeding ends of the hydraulic jacks 19 and 20, and will return fluid from the control valve 27 back to the tank 33 through the return line 47.

A time delay means inversely proportional to any overload of the motor 15 is provided to hold the armature 53 from movement along the solenoid coil 50 to engage the contacts 59 and 60 for a delay time interval after overload of the motor 15, which as shown herein, is in the form of a dashpot 64 having a piston 65 movable along a cylinder 66. The piston 65 is mounted on a stem 67 extending from the opposite end of the armature 53 from the stem 55. The cylinder 66 is filled with oil, which may be a silicon fluid, and which is displaced from the upper to the lower side of the piston 65 as the solenoid is sufficiently energized to effect movement of the armature 53 along the solenoid coil 50. A spring 68 is provided to facilitate the return of the piston 65 as the motor load drops to rated motor load.

A valve means is provided to accommodate the bleeding of fluid from the upper side of the piston 65 to the lower side of said piston and to overcome the vacuum block below said piston, which as herein shown comprises a block 69 having a plurality of bleeder passageways 70 therein connected with the upper side of the piston 65 through a fluid line 71 leading into the block 69 into fluid communication with the passageway 73 communicating with the bleeder passageways 70. The bleeder passageways 70 bleed fluid to a return passageway 74 in the block 69, connected with the underside of the piston 65 through a fluid line 75. Check valves 76, herein shown as being ball types of check valves are associated with the bleed passageways 70 on the downstream ends thereof, to prevent the backflow of fluid through said passageways to the upper side of the piston 65.

The bleed passageways 70 are of different cross-sectional areas and springs 78 for the check valves 76 are of varying strength, to progressively increase the flow of fluid from the top of the piston 65 upon increases in pressure in the passageway 73.

A check valve 77 in a valve block 79 is connected in fluid lines 80 and 81 connected respectively with the cylinder 66 from the bottom to the top sides of the piston 65. The check valve 77 acts oppositely from the check valves 76 and accommodates the quick return of fluid from the underside of the piston 65 to the top side thereof as the overload conditions are relieved.

During operation of the machine the motor current present in the electromagnet coil 50 will exert a continuing magnetic upward pull on the armature 53. The resistance to upward movement offered by the dashpot in the form of the piston 65 and cylinder 66 will restrain the armature 53 from moving upwardly along the electromagnetic coil 50 under normal current conditions when the motor 15 is operating at full load.

Upon overload conditions, however, the silicon fluid in the dashpot forced through the bleed passages 70 will cause a time delay in upward movement of the armature 53 which will accommodate the motor 15 to continue to operate for short intervals of time under overload conditions. When, however, the overload conditions continue, the piston 65 will continue its upward movement along the cylinder 66 at a rate determined by the rate of transfer of fluid from the top to the bottom of said piston and close the circuit between the contacts 59 and 60 and effect energization of the electromagnets 46. This will move the valve spool 41 to block the passage of fluid under pressure through the pressure line 21 and to return fluid from the pressure line 30 back to tank through the return line 47.

It may, therefore, be seen that the piston 65 can rise only as fast as the fluid transfers from its top to its bottom, and that the length of the time delay interval before the contact 59 closes the circuit through the contacts 60 is inversely proportional to the magnitude of the overcurrent, and that as the overcurrent increases, the time delay interval will decrease.

It may, therefore, be seen that overload protection has been provided for the advance of the cutter bar 11 during the cutting operation thereof which is determined by the loading of the motor 15 driving the cutter chain 13 about said cutter bar and that the advance of the cutter bar is stopped after the overload has continued for a short time interval, which time interval is inversely proportional to the magnitude of the current. The stopping of the advance of the cutter bar is, therefore, quickest when the overload is greatest. Thus, the cutter may be advanced when overloaded for short periods of time, but the advance of the cutter bar will be rapidly stopped upon high overload conditions, with the result that a maximum cutting advance can be maintained with the motor 15 continually operating at its rated capacity.

While I have herein shown and described one form in which my invention may be embodied, it may readily be understood that various modifications and variations in the invention may be attained without departing from the spirit and scope of the novel concepts thereof, as defined by the claims appended hereto.

I claim as my invention:

1. In an automatic control for cutting apparatus having a cutting member, drive means for driving said cutting member, advancing means for advancing said cutting member to effect a cutting operation, stop means for said advancing means operable to stop advance thereof, sensing means effective to sense the load exerted on said cutting member during operation thereof, said sensing means comprising an overload relay operable to actuate said stop means, and a dashpot including a cylinder and piston and bleeder passageways connected between opposite sides of said piston and delaying operation of said relay upon overload of said cutting member for a time delay period inversely proportional to the overload on said cutting member and thereby preventing said relay from actuating said stop means except upon sustained overload conditions.

2. In an automatic control for cutting apparatus having a cutting member, an electrically energizable motor for driving said cutting member, advancing means for advancing said cutting member to effect a cutting operation, stop means for said advancing means operable to stop the advance thereof, sensing means effective to sense the load exerted on said cutting member during operation thereof and including an electromagnet connected in series with said motor and energized at motor current during operation of said motor, and means operable in response to said sensing means to actuate said stop means at a predetermined time interval following the sensing of an overload above a predetermined load, which time interval is inversely proportional to the overload, comprising a switch operable to actuate said stop means, an armature movable to close said switch upon a predetermined overload on said motor, and time delay means retarding movement of said armature to close said switch and controlling movement of said armature to effect the closing of said switch only upon sustained overload conditions.

3. In an automatic control for cutting apparatus having a cutting member, an electrically energizable motor for driving said cutting member, advancing means for advancing said cutting member to effect a cutting operation, stop means for said advancing means operable to stop the advance thereof, sensing means effective to sense the load exerted on said cutting member during operation thereof and including an electromagnet connected in series with said motor and energized at motor current during operation of said motor, and means operable in response to said sensing means to actuate said stop means at a predetermined time interval following the sensing of an overload above a predetermined load, which time interval is inversely proportional to the overload, comprising a switch operable to actuate said stop means, an armature movable to close said switch upon a predetermined overload on said motor, and means retarding movement of said armature to close said switch and controlling movement of said armature to close said switch upon sustained overload conditions, comprising a cylinder having a piston movable therealong and operatively connected with said armature and bleeder means connecting one side of said piston to the other.

4. In an overload cut-out for cutting apparatus having a cutting member, an electrically energizable motor for driving said cutting member, a hydraulic motor for advancing said cutting member to effect a cutting operation, a source of fluid under pressure, a pressure line connected from said source of fluid under pressure to said hydraulic motor, a stop valve in said pressure line, a solenoid energizable to actuate said valve to stop the flow of fluid under pressure to said hydraulic motor, an energizing circuit to said solenoid including a normally open switch, sensing means effective to sense the load exerted on said cutting member during operation thereof and including an electromagnet electrically connected with said motor and energized at motor current, an armature actuated by said electromagnet upon predetermined overload conditions of said motor and having operative connection with said switch to close said switch and energize said solenoid, and time delay means delaying operation of said armature to close said switch upon overload of said cutting member and motor for a time delay interval inversely proportional to the overload and thereby effect closing of said switch only upon sustained overload conditions of said motor.

5. In an overload cut-out for cutting apparatus having a cutting member, an electrically energizable motor for driving said cutting member, a hydraulic motor for advancing said cutting member to effect a cutting operation, a source of fluid under pressure, a pressure line connected from said source of fluid under pressure to said hydraulic motor, a stop valve in said pressure line, a solenoid energizable to actuate said valve to stop the flow of fluid under pressure to said hydraulic motor, an energizing circuit to said solenoid including a normally open switch, sensing means effective to sense the load exerted on said cutting member during operation thereof and including an electromagnet electrically connected with said motor and energized at motor current, an armature actuated by said electromagnet upon predetermined overload conditions of said motor and having operative connection with said switch to close said switch and energize said solenoid, a cylinder in axial alignment with said armature, a piston connected with said armature and movable along said cylinder, and passsageway means accommodating the displacement of oil from one side to the other of said piston to effect a delay in the operation of said armature to close said switch upon overload of said cutting member and motor for a time interval inversely proportional to the load on said cutting motor.

6. In an overload cut-out for cutting apparatus having a cutting member, an electrically energizable motor for driving said cutting member, a hydraulic motor for advancing said cutting member to effect a cutting operation, a source of fluid under pressure, a pressure line connected from said source of fluid under pressure to said hydraulic motor, a stop valve in said pressure line, a solenoid energizable to actuate said valve to stop the flow of fluid under pressure to said hydraulic motor, an energizing circuit to said solenoid including a normally open switch, sensing means effective to sense the load exerted on said cutting member during operation thereof and including an electromagnet electrically connected with said motor and energized at motor current, an armature actuated by said electromagnet upon predetermined overload conditions of said motor and having operative connection with said switch to close said switch and energize said solenoid, a cylinder in axial alignment with said armature, a piston connected with said armature and movable along said cylinder, passageway means affording communication between opposite sides of said piston and accommodating said armature to move said piston along said cylinder and including a plurality of bleed passageways having check valves therein, other passageway means affording communication between opposite sides of said piston and having a check valve therein operating oppositely to said first mentioned check valve and accommodating quick return of said piston, said bleed passageways delaying operation of said armature upon overload of said cutting member and motor for a time interval proportional to the overload.

References Cited in the file of this patent
UNITED STATES PATENTS

| 1,412,868 | Holmes | Apr. 18, 1922 |
| 2,334,771 | Jeffrey et al. | Nov. 23, 1943 |

FOREIGN PATENTS

| 219,133 | Great Britain | of 1924 |